No. 846,460. PATENTED MAR. 12, 1907.
J. E. DUNDORE.
LOCKING HAT AND COAT RACK.
APPLICATION FILED DEC. 6, 1906.
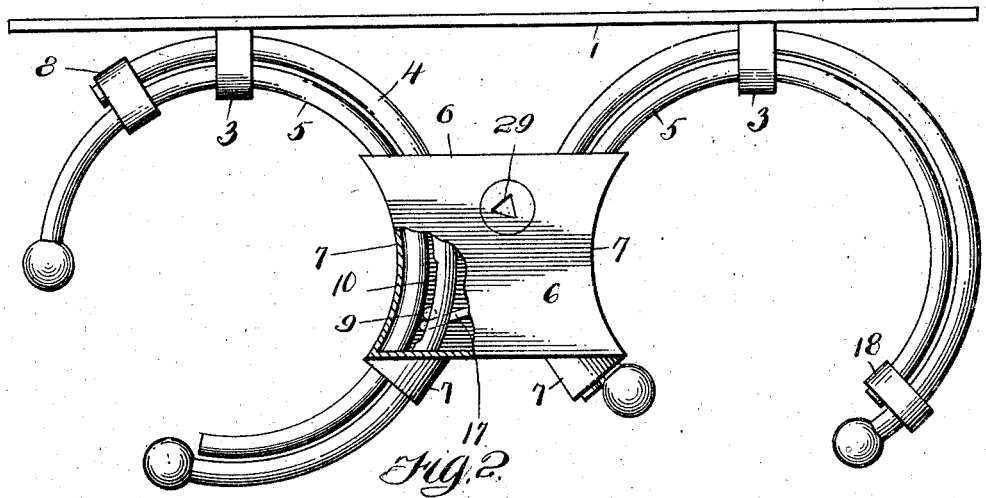
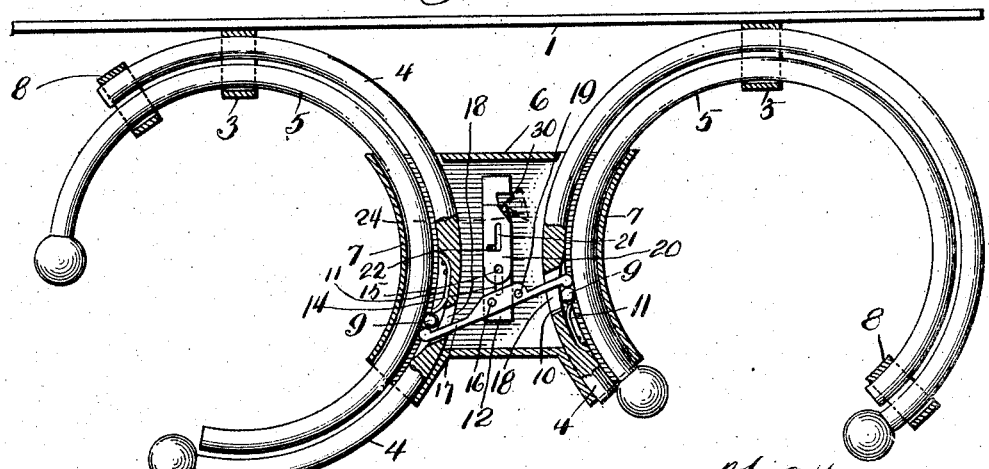
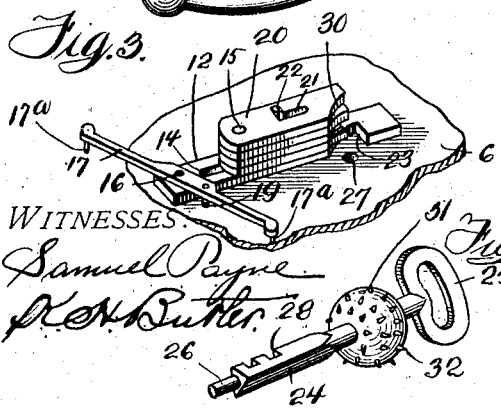
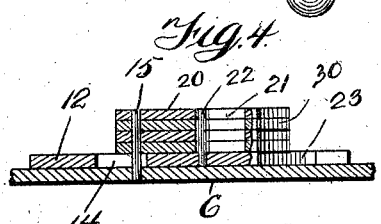
WITNESSES
Samuel Payne
INVENTOR
J. E. Dundore
BY H. C. Everitt Co.

UNITED STATES PATENT OFFICE.

JACOB E. DUNDORE, OF WILKINSBURG, PENNSYLVANIA.

LOCKING HAT AND COAT RACK.

No. 846,460.         Specification of Letters Patent.         Patented March 12, 1907.

Application filed December 6, 1906. Serial No. 346,588.

*To all whom it may concern:*

Be it known that I, JACOB E. DUNDORE, a citizen of the United States of America, residing at Wilkinsburg, in the county of Allegheny and State of Pennsylvania, have invented certain new and useful Improvements in Locking Hat and Coat Racks, of which the following is a specification, reference being had therein to the accompanying drawing.

This invention relates to locking hat and coat racks; and its object is to provide a simple and inexpensive device of this character which will effectively serve the purpose of securing a hat or coat against removal by unauthorized persons.

The invention comprises a pair of clasps, each consisting of two coöperating members of circular form, in combination with a lock-casing and a locking-bar for securing the movable members of the clasps.

The construction of the improvement will be fully described hereinafter in connection with the accompanying drawing, which forms part of this specification, and its novel features will be defined in the appended claims.

In the drawing, Figure 1 is a top plan view of the improved coat and hat rack, partly broken away. Fig. 2 is a similar view of the same, partly in horizontal section. Fig. 3 is a view in perspective of the locking mechanism employed. Fig. 4 is a vertical sectional view of the same. Fig. 5 is a perspective view of the key for releasing the locking-bar.

The reference-numeral 1 designates a bar or plate adapted to be secured to a wall or other support by screws or like fastening devices.

From the bar 1 project two loops or keepers 3, serving as supports for the two clasps employed. As these clasps are similar in construction, a specific description of one will suffice both. Each clasp consists of a stationary member 4 of approximately circular form and a movable member 5 of similar shape, but of smaller diameter to adapt it to fit within the outer stationary member 4. A lock-casing 6, formed with oppositely-disposed curved guideways 7, is fixed to the stationary members 4, and through said guideways the members 5 are adapted to move. Each member is further guided in its movement by strap 8, carried by the end of the stationary member 4.

To lock the movable members in a fixed position, I employ spherical bodies or balls 9, said balls being housed in beveled slots 10, formed in the stationary members 4 and being retained in engagement with the movable members 5 by springs 11. The balls 9 serve to wedge the movable members within the lock-casing 6, and the wedging action of said balls prevents said members from being moved except when the balls are loosened within their slots or disengaged from the movable members.

The mechanism used for moving the spherical bodies or balls 9 consists of a bar 12, mounted in the casing 6. The bar is slotted, as at 14, and is guided in its movement by an upwardly-extending pin 15, carried by the bottom of the casing 6. Pivotally connected, as at 16, to said bar is a lever 17, the depending ends 17ª of said lever extending through slots 18, formed in the stationary members 4 of the clasp and engaging the balls 9. The lever 17 is pivotally connected to the casing 6, as at 19.

Pivotally connected to the pin 15 and resting upon the bar 12 are a plurality of wards 20, said wards being provided with alining bayonet-shaped slots 21, into which extends a pin 22, carried by the bar 12. The forward end of the bar 12 is notched, as at 23, to accommodate the shank 24 of a key 25. The shank 24 is substantially triangular in cross-section and is provided with a contracted end 26, adapted to fit in an opening 27, formed in the bottom of the casing 6. The triangular portion of the shank 24 is provided with clefts 28, corresponding in depth to the wards 20, carried by the bar 12.

The key 25 is inserted through a triangular opening 29, formed in the lock-casing 6, and by turning the key the beveled ends 30 of the wards 20 are moved outwardly, whereby the pin 22 alines with the longitudinal portion of the slots 21. A further movement of the key 25 impinges the notched end of the bar 12, moving said bar and the lever 17. As the lever 17 is pivotally mounted in the casing 6, the ends of said lever will move the balls 9, compressing the springs 11 and releasing the movable members 5 of the clasp, allowing the clasp to be closed to engage a hat or coat placed in said clasp. Upon releasing the key 25 the springs 11 force the balls 9 into engagement with the movable members and through the medium of the lever 17 returns the bar 12 and its appurtenant parts to their normal position. I have provided the key 25 with a spherical body 31, having a plurality of sharp prongs 32, adapted to prick a party's fingers when using the key and in this manner attract their attention and prevent him from leaving the key in the lock.

It is obvious that a plurality of clasps may be readily arranged upon the supporting-bar 1 and that said clasps may be made of any desired material and finished according to one's esthetic tastes.

What I claim, and desire to secure by Letters Patent, is—

1. A hat and coat rack consisting of a supporting-bar, clasps supported thereby and comprising stationary members and movable members, a locking-casing carried by said stationary members and having guideways for said movable members, spring-held balls mounted in said stationary members and engaging said movable members, a pivoted lever adapted to engage said balls, a locking mechanism controlling the movement of said lever, and a key for manipulating said locking mechanism.

2. A hat and coat rack consisting of a supporting-bar, clasps carried thereby, said clasps comprising movable members and stationary members, a locking-casing carried by said members, movable spring-held balls carried by said stationary members and engaging said movable members, and a locking mechanism located in said casing for moving said balls out of engagement with said movable members.

3. In a hat and coat rack, a supporting-bar, a clasp carried thereby, said clasp comprising a movable member and a stationary member, a casing supported by said stationary member and having a guideway for said movable member, and means mounted in said casing for locking said movable member in a fixed position.

4. In a hat and coat rack, a supporting-bar, clasps carried by said bar, said clasps comprising movable members and stationary members, and means interposed between said clasps to lock said movable members in a fixed position.

In testimony whereof I affix my signature in the presence of two witnesses.

JACOB E. DUNDORE.

Witnesses:
MAX H. SROLOVITZ,
K. H. BUTLER.